(12) United States Patent
Mullen et al.

(10) Patent No.: US 10,745,122 B2
(45) Date of Patent: Aug. 18, 2020

(54) REDUNDANT HELICOPTER PITCH CHANGE SHAFT SYSTEM

(71) Applicant: Sikorsky Aircraft Corporation, Stratford, CT (US)

(72) Inventors: Michael F. Mullen, Cheshire, CT (US); William Wolcott, Milford, CT (US); Kyle Winters, Milford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 277 days.

(21) Appl. No.: 15/918,816

(22) Filed: Mar. 12, 2018

(65) Prior Publication Data

US 2019/0276144 A1    Sep. 12, 2019

(51) Int. Cl.
*B64C 27/58* (2006.01)
*F16C 19/49* (2006.01)
*B64C 27/82* (2006.01)

(52) U.S. Cl.
CPC .............. *B64C 27/58* (2013.01); *B64C 27/82* (2013.01); *F16C 19/49* (2013.01)

(58) Field of Classification Search
CPC ..... B64C 27/605; B64C 27/82; F16C 19/522; F16C 41/001; F16C 19/49
See application file for complete search history.

(56) References Cited

U.S. PATENT DOCUMENTS

| | | | |
|---|---|---|---|
| 3,811,742 A | * | 5/1974 | Rosales ................. F16C 19/163 384/461 |
| 9,359,073 B2 | | 6/2016 | Hewitt |
| 9,840,325 B2 | | 12/2017 | Sutton et al. |

* cited by examiner

*Primary Examiner* — Kayla Mccaffrey
(74) *Attorney, Agent, or Firm* — Cantor Colburn LLP

(57) ABSTRACT

An aircraft tail rotor system includes a rotating pitch change shaft, a translating element, and a pitch change bearing assembly including a first bearing and a second bearing. The pitch change bearing assembly is operable to transmit movement of the translating element to the rotating pitch change shaft via the first bearing or the second bearing. A failure section is formed at an interface between the first bearing and the translating element. When the failure section decouples the first bearing from the translating element such that the first bearing does not transmit movement of the translating element to the rotating pitch change shaft, the second bearing transmits movement of the translating element to the rotating pitch change shaft.

19 Claims, 4 Drawing Sheets

REDUNDANT HELICOPTER PITCH CHANGE SHAFT SYSTEM

BACKGROUND

Embodiments disclosed herein relate to an aircraft tail rotor system, and more particularly, to a pitch change shaft bearing assembly for use with an aircraft tail rotor system.

In a typical rotary wing aircraft, such as a helicopter for example, a tail rotor system converts tail driveshaft rotary power into the aerodynamic forces necessary to control the direction of flight and to counteract main rotor torque.

A tail rotor head system provides a mounting point for connecting a plurality of tail rotor blades to a blade pitch change mechanism. The pitch of the tail rotor blades is controlled by a position of a tail rotor pitch change shaft. The position of the pitch change shaft is controlled by a pitch change servo. When the pitch change servo pulls the pitch change shaft inboard, the pitch beam and the pitch change links twist the tail rotor blades about internal elastomeric bearings to increase the blade pitch. Conversely, when the pitch change servo permits the pitch change shaft to move outboard, the pitch change shaft bearing and the pitch change links twist the tail rotor blades about internal elastomeric bearings to decrease blade pitch. This adjustment in the blade pitch is used to control a turning direction of the aircraft.

The pitch change shaft rotates with and moves linearly within a rotating tail rotor shaft, also commonly referred to as an output gear shaft. A pitch change bearing supports the pitch change shaft within the tail rotor shaft and allows the pitch change shaft and tail rotor shaft to rotate independently of the non-rotating pitch change servo rod. In a typical arrangement, the pitch change shaft bearing outer raceway rotates with the pitch change shaft and the tail rotor shaft, while the inner raceway is non-rotating hut moves linearly with the pitch change servo rod.

BRIEF DESCRIPTION

According to an embodiment, an aircraft tail rotor system includes a rotating pitch change shaft, a translating element, and a pitch change bearing assembly including a first bearing and a second bearing. The pitch change bearing assembly is operable to transmit movement of the translating element to the rotating pitch change shaft via the first bearing or the second bearing. A failure section is formed at an interface between the first bearing and the translating element. When the failure section decouples the first bearing from the translating element such that the first bearing does not transmit movement of the translating element to the rotating pitch change shaft, the second bearing transmits movement of the translating element to the rotating pitch change shaft.

In addition to one or more of the features described above, or as an alternative, in further embodiments the second bearing is operable to transmit movement of the translating element to the rotating pitch change shaft only when the first bearing has seized and is decoupled from the translating element at the failure section In addition to one or more of the features described above, or as an alternative, in further embodiments the failure section includes a slot extending partially between the first bearing and the translating element which shears when the first bearing has seized so as to decouple the first bearing from the translating element.

In addition to one or more of the features described above, or as an alternative, in further embodiments the translating element includes a clevis having a first arm and a second arm, and a shaft coupled to the clevis, the slot is formed in one of the first arm and the second arm.

In addition to one or more of the features described above, or as an alternative, in further embodiments the failure section includes a contact liner which degrades when the first bearing has seized so as to decouple the first bearing from the translating element.

In addition to one or more of the features described above, or as an alternative, in further embodiments the first bearing is decoupled from the translating element when a clearance is formed between the contact liner and the first bearing.

In addition to one or more of the features described above, or as an alternative, in further embodiments the clearance is formed as a result of friction between the first bearing and a surface of the contact liner.

In addition to one or more of the features described above, or as an alternative, in further embodiments the clearance is formed as a result of heated generated from contact between the first bearing and a surface of the contact liner.

In addition to one or more of the features described above, or as an alternative, in further embodiments the pitch change shaft includes a first protrusion and a second protrusion and the second bearing selectively engages one of the first protrusion and the second protrusion to transmit movement of the translating element to the pitch change shaft.

In addition to one or more of the features described above, or as an alternative, in further embodiments the first bearing is a spherical bearing.

In addition to one or more of the features described above, or as an alternative, in further embodiments the second bearing includes at least one roller element.

In addition to one or more of the features described above, or as an alternative, in further embodiments the second bearing includes an outer race and gap is defined between an interior surface of the pitch change shaft and the outer race.

In another embodiment, a method of transmitting movement from a translating element to a pitch change shaft upon failure of a first bearing between the translating element and the pitch change shaft includes decoupling the first bearing from the translating element when the first bearing fails and while the first bearing is decoupled from the translating element, moving a secondary bearing coupled to the translating element in a first direction into contact with a first protrusion extending from the pitch change shaft to transmit movement of the translating element to the pitch change shaft.

In addition to one or more of the features described above, or as an alternative, in further embodiments comprising moving the secondary bearing in a second direction other than the first direction into contact with a second protrusion extending from the pitch change shaft to transmit movement of the translating element to the pitch change shaft.

In addition to one or more of the features described above, or as an alternative, in further embodiments the decoupling of the primary bearing from the translating element includes decoupling the primary bearing from the translating element at a failure section.

In addition to one or more of the features described above, or as an alternative, in further embodiments the decoupling of the primary bearing from the translating element includes shearing a connection between the first bearing and the translating element.

In addition to one or more of the features described above, or as an alternative, in further embodiments the decoupling of the primary bearing from the translating element includes forming a clearance between a contact liner and the first bearing.

In addition to one or more of the features described above, or as an alternative, in further embodiments the forming the clearance between the contact liner and the first bearing includes wearing a surface of the contact liner via friction.

In addition to one or more of the features described above, or as an alternative, in further embodiments the forming the clearance between the contact liner and the first bearing includes melting a surface of the contact liner.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
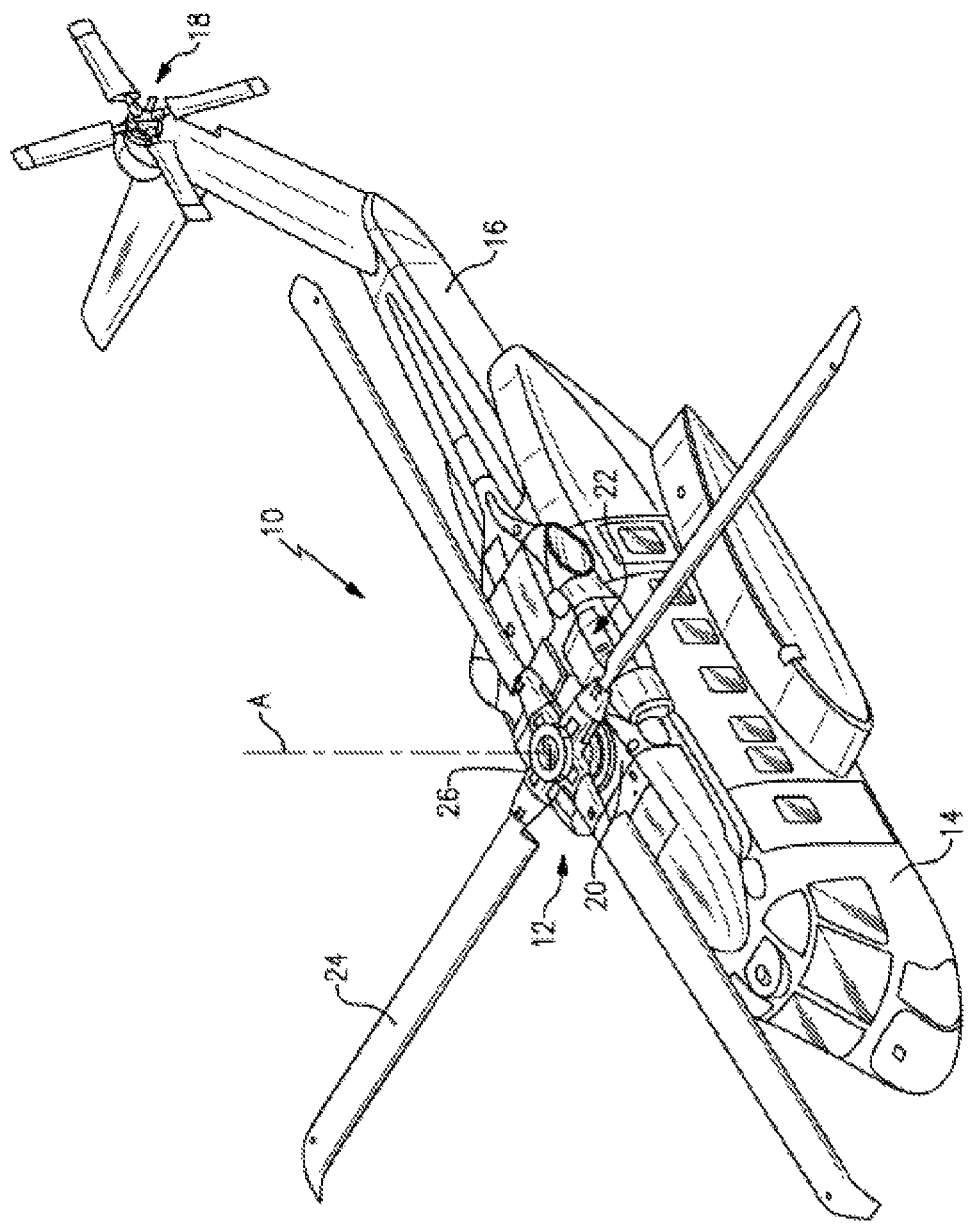
FIG. 1 is a perspective view of an example of a rotary wing aircraft.

With reference now to FIG. 1A, an example of a vertical takeoff and landing (VTOL) aircraft is schematically illustrated. The aircraft 10 in the disclosed, non-limiting embodiment includes a main rotor system 12 supported by an airframe 14 having an extending tail 16 which mounts an anti-torque system 18. The main rotor assembly 12 is driven about an axis of rotation A through a main rotor gearbox (MGB) 20 by a one or more engines 22. The engines 22 generates the power available for flight operations and couples such power to the main rotor assembly 12 and the and-torque system 18 through the MGB 20. The main rotor system 12 includes a multiple of rotor blades 24 mounted to a rotor hub 26. Although a particular helicopter configuration is illustrated and described in the disclosed embodiment, other configurations and/or machines, such as high speed compound rotary-wing aircraft with supplemental translational thrust systems, dual contra-rotating, coaxial rotor system aircraft, turbo-props, tilt-rotors tilt-wing aircraft and non-aircraft applications such as wind turbines will also benefit here from.

Figure 2:
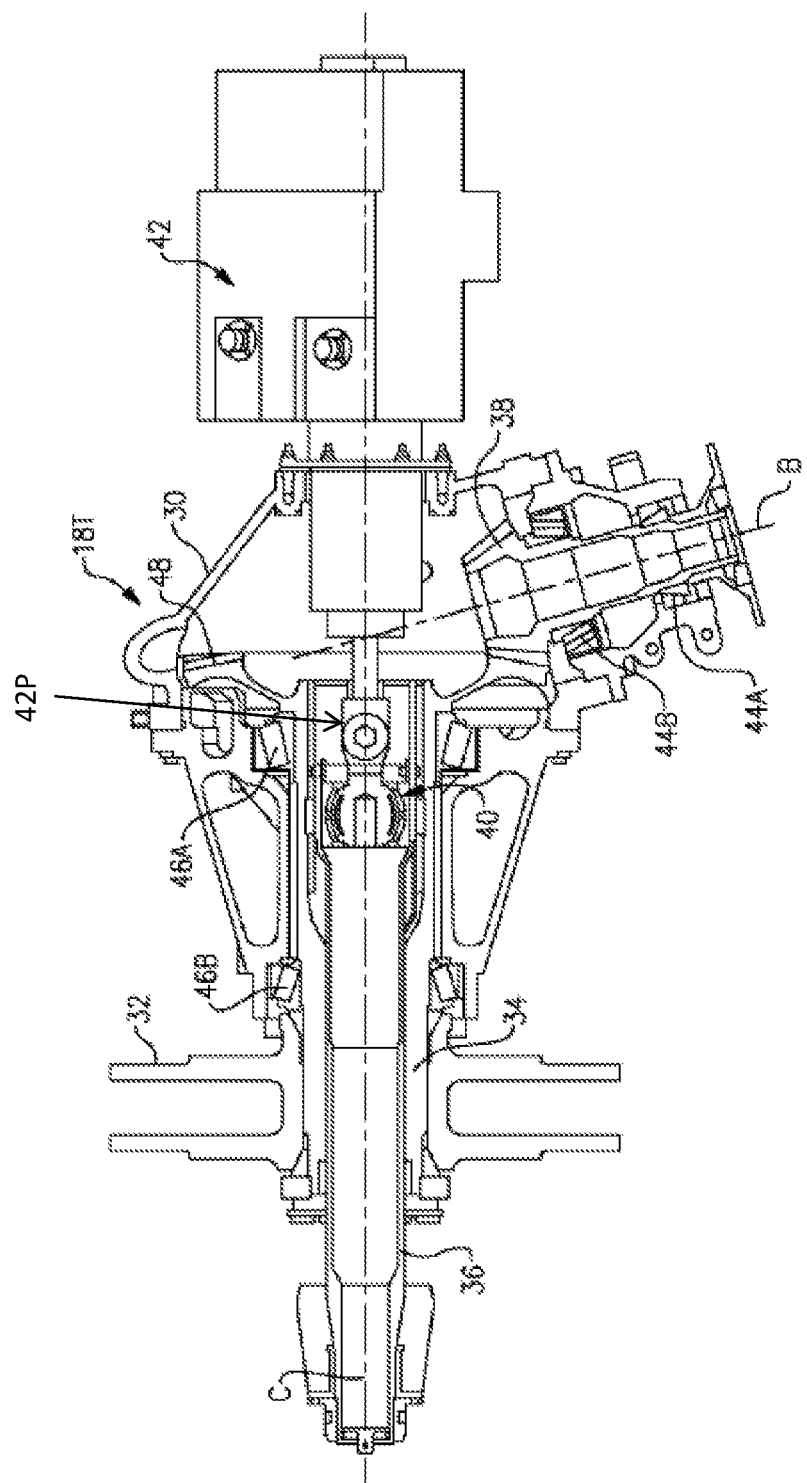
FIG. 2 is a sectional view of a gear module of an anti-torque system of the rotary wing aircraft of FIG. 1.

Referring now to FIG. 2, the anti-torque system 18 includes a gear module 18T, also commonly referred to as a tail gearbox, driven by the main gearbox 20. The gear module 18T generally includes a housing 30, a tail blade cuff assembly 32, a tail rotor drive shaft 34, a tail rotor pitch change shaft 36, a drive gear 38, a pitch change bearing assembly 40 and a pitch change servo 42. The drive gear 38 is supported upon bearings 44A, 44B for rotation about an axis of rotation B. The tail rotor drive shaft 34 is supported upon bearings 46A, 46B for rotation about an axis of rotation C. The drive gear 38 engages a shaft gear 48 to rotate the tail rotor drive shaft 34 and the attached blade cuff assembly 32. The tail rotor pitch change shaft 36 rotates with the tail rotor drive shaft 34 about the axis of rotation C, but serves no significant power transmission function.

The pitch change shaft 36 rotates with and moves linearly within the rotating tail rotor drive shaft 34. The bearing assembly 40 includes a spherical bearing 50 that supports the pitch change shaft 36 in a manner that allows that pitch change shaft 36 to rotate independently of the pushrod 42P coupled to the servo 42. An outer surface or race of the bearing 50 rotates with the pitch change shaft 36 while an inner surface or race of the bearing 50 is non-rotating and is coupled to the pushrod 42P for linear movement via the servo 42. Through this engagement with the hearing 50, the tail rotor pitch change shaft 36 slides along the axis of rotation C in response to actuation of the servo 42 to change the pitch of the tail blade cuff assembly 32 and the tail rotor blades attached thereto (not shown) and thus reduces or increases the thrust of the anti-torque system 18.

In flight failure of the pitch change bearing assembly 40 must be accounted for. Accordingly, to maintain normal operation of the aircraft in the event of a failure of the pitch change shaft hearing 50, in an embodiment, the pitch change shaft bearing assembly 40 is a redundant bearing assembly including not only a primary bearing 50, but also a secondary bearing 52. During normal operation, the primary bearing 50 of the redundant pitch change bearing assembly 40 operates as the only hearing, in a manner similar to an existing pitch change bearing assembly. The secondary bearing 52 is simply provided as a backup bearing that is operational only when a failure of the primary bearing 50 has occurred.

Figure 3:
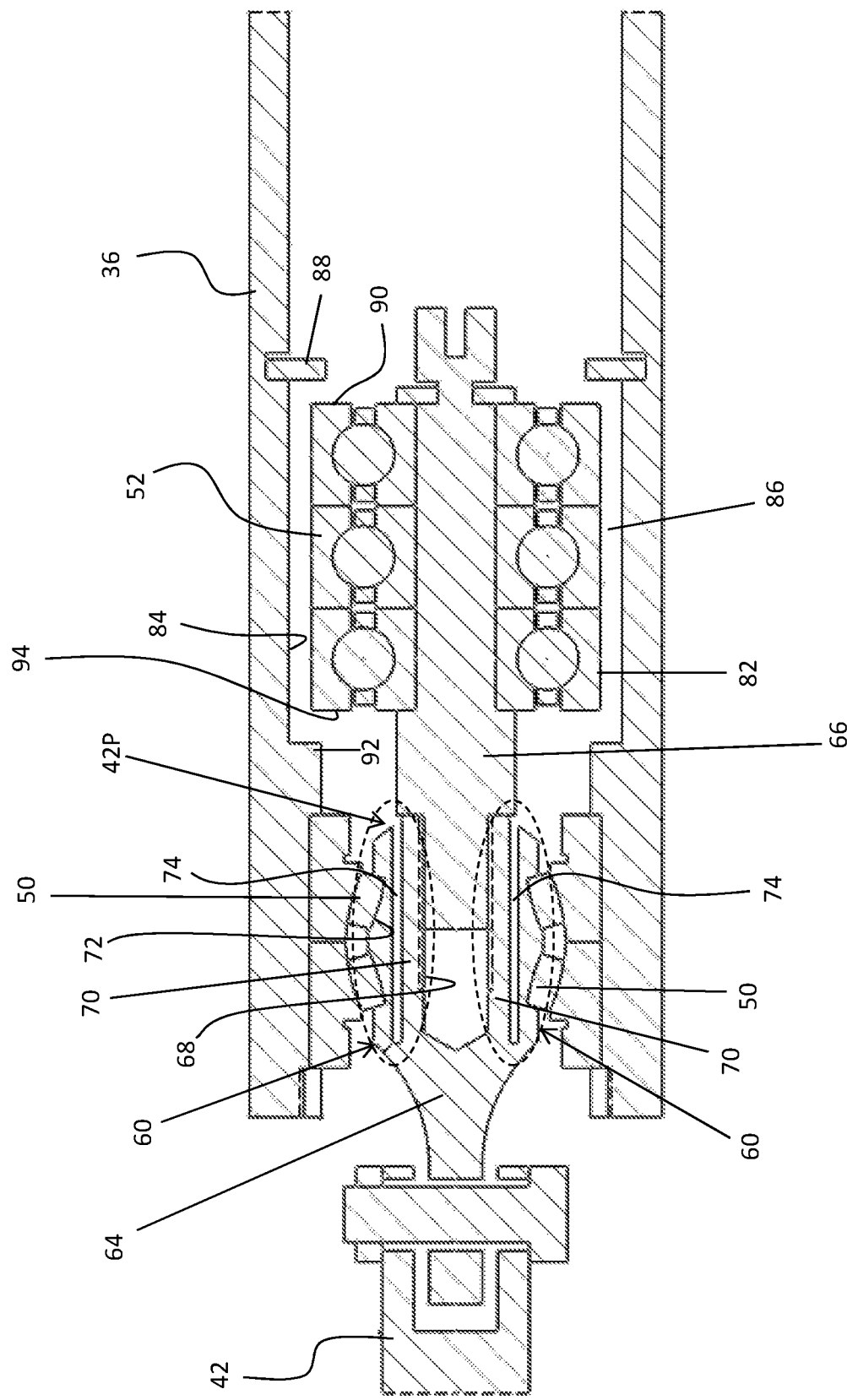
FIG. 3 is a cross-sectional view of a pitch change bearing assembly of the gear module according to an embodiment.

With reference now to FIG. 3, an example of a secondary bearing 52 is shown. The secondary bearing 52 may be mounted to the pushrod 42P downstream from the primary bearing 50 (i.e., such that the primary bearing 50 is between the secondary bearing 52 and the servo 42). In the illustrated, non-limiting embodiment, the secondary bearing 52 is an assembly formed from three bearings stacked together. However, a secondary bearing 52 having any number of bearings, including a single bearing, two bearings, or more than three bearings are also contemplated herein. As shown, the secondary bearing 52 may be a roller hearing having one or more roller elements (not shown) arranged between an inner race and an outer race. It should be understood that any suitable type of bearing is considered within the scope of the disclosure.

Further, a failure or shear section 60 is formed at the interface between the primary bearing 50 and the pushrod 42P connected to the servo 42. With respect to the non-limiting embodiment illustrated in FIG. 3, the pushrod 42P includes a clevis 64 coupled to the servo 42, and a shaft 66 coupled to an interior surface 68 of the arms 70 of the clevis 64. Although the shaft 66 is described as being threadably coupled to the clevis 64, any suitable mechanism or connector for coupling the shaft 66 and the clevis 64 is within the scope of the disclosure. The inner surface 72 of the primary bearing 50 is mounted about the exterior of the clevis arms 70 and the secondary bearing 52 is mounted about an exterior of the shaft 66 located downstream form the clevis 64.

As shown, the failure section 60 includes a shear section 74 extending through a portion of each of the arms 70 of the clevis 64. In the illustrated, non-limiting embodiment, each shear section 74 includes one or more slots formed in a portion of the pushrod 42P. However, it should be understood that any suitable shear section design is considered within the scope of the disclosure. The shear sections 74 may be oriented substantially parallel to the axis C of the pushrod 42P to facilitate a fracture through the portion of the arms 70 adjacent the shear section 74.

In the event of a failure of the primary bearing 50, such as via a seizure of the primary bearing 50 relative to the pitch change shaft 36 for example, the force acting on the pushrod 42P will cause the clevis arms 70 to break, and more specifically to shear, at each failure section 60. As shown, the arms 70 of the clevis 64 will shear adjacent each of shear section 74, thereby decoupling the primary bearing 50 from the pushrod 42P. As a result, further movement of the pushrod 42P by the servo 42 will not be transmitted to the pitch change shaft 36 via the primary bearing 50.

Figure 4:
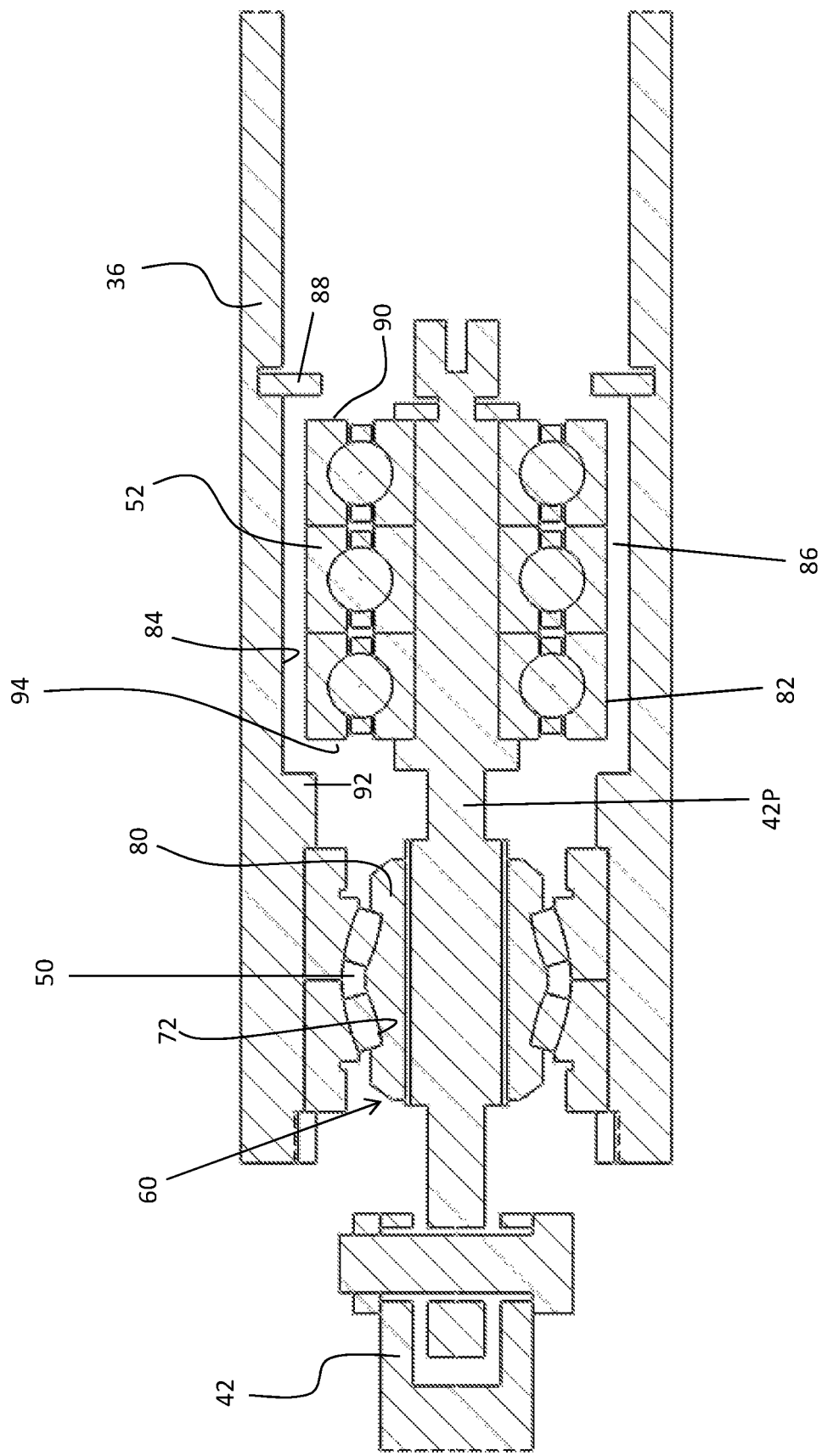
FIG. 4 is a cross-sectional view of a pitch change bearing assembly of the gear module according to an embodiment.

In another embodiment, best shown in FIG. 4, the failure section 60 includes a contact liner or coating 80 arranged between the exterior surface of the pushrod 42P and the inner surface 72 of the primary bearing 50. Any suitable material may be used to form the coating 80. During normal operation, the primary bearing 50 and the pushrod 42P move in unison, such that no relative movement occurs between the primary bearing 50 and the coating 80. However, in the event the primary bearing 50 seizes or fails and movement is therefore restricted, the relative motion between the coating 80 and the primary bearing 50 will cause the coating 80 to degrade. In an embodiment, the degradation results from heat generated in the coating 80 by friction or by a shear load. Alternatively, or in addition, the friction between the primary bearing 50 and the coating 80 may physically grind or wear the surface of the coating 80. This degradation of the coating 80 results in the formation of a clearance between the inner surface 72 of the primary bearing 50 and the pushrod 42P, thereby decoupling the primary bearing 50 from the pushrod 42P. As a result, further movement of the pushrod 42P by the servo 42 will not be transmitted to the pitch change shaft 36 via the primary bearing 50.

As previously described, during normal operation, the secondary bearing 52 does not engage the pitch change shaft 36. Rather, translation of the pushrod 42P is transmitted to the pitch change shaft 36 via the primary bearing 50. However, upon failure of the primary bearing 50, and the subsequent decoupling of the primary bearing 50 from the pushrod 42P via the failure section 60, the secondary bearing 52 is relied upon to transmit linear motion to the pitch change shaft 36. In an embodiment, the outer race 82 of the secondary bearing 52 is separated from a surface 84 of the pitch change shaft 36 by a clearance 86. Because of this clearance 86, the pitch change shaft 36 is free to rotate relative to the secondary bearing 52.

A first protrusion 88 arranged adjacent a first end 90 of the second bearing 52 extends inwardly from an inner surface 84 of the pitch change shaft 36 towards the secondary bearing 52. Similarly, a second protrusion 92 positioned generally adjacent a second, opposite end 94 of the second bearing 52 may extend inwardly from the pitch change shaft 36 towards the secondary bearing 52. As the servo 42 moves the pushrod 42P, and the secondary bearing 52 coupled thereto, in a first direction, the first end 90 of the secondary bearing 52 engages the first protrusion 88 to transmit linear motion from the pushrod 42P to the pitch change shaft 36. However, it should be understood that the engagement illustrated and described herein is intended as an example only, and that such engagement may be reasonably made by various features, including, but not limited to a face spline or friction device for example. Similarly, as the servo 42 moves the pushrod 42P, and therefore the secondary bearing 52, in a second, opposite direction, the second end 94 of the secondary hearing 52 contacts the second protrusion 92 to transmit linear motion to the pitch change shaft 36.

The redundant pitch change shaft bearing 40 enables longer service life and increased inspection intervals because failure of a primary bearing 50 would result only in the need for routine maintenance, rather than a catastrophic event.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An aircraft tail rotor system, comprising:
a rotating pitch change shaft;
a translating element;
a pitch change bearing assembly including a first bearing and a second bearing, the pitch change bearing assembly being operable to transmit movement of the translating element to the rotating pitch change shaft via the first bearing or the second bearing; and
a failure section formed at an interface between the first bearing and the translating element, wherein when the failure section decouples the first bearing from the translating element such that the first bearing does not transmit movement of the translating element to the rotating pitch change shaft, the second bearing transmits movement of the translating element to the rotating pitch change shaft.

2. The aircraft tail rotor system of claim 1, wherein the second bearing is operable to transmit movement of the translating element to the rotating pitch change shaft only when the first bearing has seized and is decoupled from the translating element at the failure section.

3. The aircraft tail rotor system of claim 1, wherein the failure section includes a slot extending partially between the first bearing and the translating element which shears when the first bearing has seized so as to decouple the first bearing from the translating element.

4. The aircraft tail rotor system of claim 3, wherein the translating element includes a clevis having a first arm and a second arm, and a shaft coupled to the clevis, the slot is formed in one of the first arm and the second arm.

5. The aircraft tail rotor system of claim 1, wherein the failure section includes a contact liner which degrades when the first bearing has seized so as to decouple the first bearing from the translating element.

6. The aircraft tail rotor system of claim 5, wherein the first bearing is decoupled from the translating element when a clearance is formed between the contact liner and the first bearing.

7. The aircraft tail rotor system of claim 6, wherein the clearance is formed as a result of friction between the first bearing and a surface of the contact liner.

8. The aircraft tail rotor system of claim 6, wherein the clearance is formed as a result of heat generated from contact between the first bearing and a surface of the contact liner.

9. The aircraft tail rotor system of claim 1, wherein the pitch change shaft includes a first protrusion and a second protrusion and the second bearing selectively engages one of the first protrusion and the second protrusion to transmit movement of the translating element to the pitch change shaft.

10. The aircraft tail rotor system of claim 1, wherein the first bearing is a spherical bearing.

11. The aircraft tail rotor system of claim 1, wherein the second bearing includes at least one roller element.

12. The aircraft tail rotor system of claim 1, wherein the second bearing includes an outer race and a gap is defined between an interior surface of the pitch change shaft and the outer race.

13. A method of transmitting movement from a translating element to a pitch change shaft upon failure of a first bearing between the translating element and the pitch change shaft, the method comprising:

decoupling the first bearing from the translating element when the first bearing fails; and while the first bearing is decoupled from the translating element, moving a secondary bearing coupled to the translating element in a first direction into contact with a first protrusion extending from the pitch change shaft to transmit movement of the translating element to the pitch change shaft.

14. The method of claim 13, further comprising moving the secondary bearing in a second direction other than the first direction into contact with a second protrusion extending from the pitch change shaft to transmit movement of the translating element to the pitch change shaft.

15. The method of claim 13, wherein the decoupling of the first bearing from the translating element includes decoupling the primary bearing from the translating element at a failure section.

16. The method of claim 13, wherein the decoupling of the first bearing from the translating element includes shearing a connection between the first bearing and the translating element.

17. The method of claim 13, wherein the decoupling of the first bearing from the translating element includes forming a clearance between a contact liner and the first bearing.

18. The method of claim 17, wherein the forming the clearance between the contact liner and the first bearing includes wearing a surface of the contact liner via friction.

19. The method of claim 17, wherein the forming the clearance between the contact liner and the first bearing includes melting a surface of the contact liner.

* * * * *